May 20, 1941.  W. A. LAZIER ET AL  2,242,309
PROCESS FOR PURIFYING NITRILES
Filed March 23, 1938
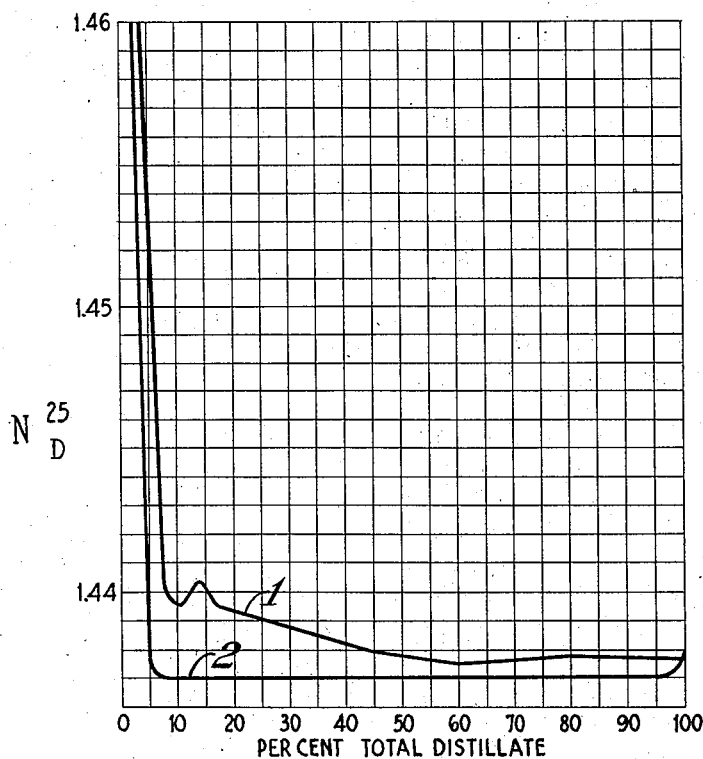
Wilbur A. Lazier
George W. Rigby   INVENTORS Patented May 20, 1941

2,242,309

UNITED STATES PATENT OFFICE 2,242,309

PROCESS FOR PURIFYING NITRILES

Wilbur A. Lazier and George W. Rigby, Wilmington, Del., assignors to E. I. du Pont de Nemours & Company, Wilmington, Del., a corporation of Delaware Application March 23, 1938, Serial No. 197,626

10 Claims. (Cl. 260—464)

This invention relates to the purification of nitriles, and more particularly to the purification of aliphatic dinitriles, and still more particularly to the purification of adiponitrile.

The usual method of purifying nitriles is by vacuum distillation (see Organic Syntheses, Coll. vol. I, pp. 38, 101, 500 and 521). For most purposes the nitriles so obtained are sufficiently pure to be used in subsequent chemical reactions. However, the products usually darken on standing and in some cases hydrogen cyanide is evolved. The presence of hydrogen cyanide is well known to be very harmful to active hydrogenation catalysts such as finely divided nickel. In the presence of large amounts of hydrogen cyanide the catalyst is rendered completely inactive while the presence of smaller amounts greatly diminishes the activity of the catalyst and thereby lowers the yield of primary amines which are obtained by the hydrogenation of the nitrile. The color which develops in nitriles seems to be associated with the formation of tar-like products which foul the hydrogenation catalyst and reduce the yield of the desired products. Finally these colored materials are not removed during the hydrogenation. They impart their color to the amines produced and render the latter unsuited for many uses until they have been carefully purified. This is both troublesome and expensive.

Aliphatic dinitriles, such as adiponitrile, are particularly difficult to obtain pure; i. e., with constant and reproducible physical properties. The accompanying drawing represents a graph comparing the properties of adiponitrile prepared by the catalytic dehydration of a mixture of adipic acid and ammonia vapors and purified by the usual distillation method, with the properties of the same adiponitrile purified by the invention described herein. Curve I records graphically the refractive indices obtained on successive fractions during a typical vacuum distillation of adiponitrile. As a contrast, curve II records graphically the refractive indices for similar fractions of adiponitrile purified by the method of this invention.

The object of this invention, therefore, is to provide a simple, effective, and inexpensive method of purifying nitriles and particularly to provide such a method for purifying aliphatic dinitriles. A further object of this invention is to obtain aliphatic dinitriles of improved quality as measured by stability to light and air, and possessing constant and reproducible physical properties. A still further object of this invention is to obtain adiponitrile as an essentially pure compound. Other objects will appear hereinafter.

These objects are accomplished by a purification process which comprises the step of contacting the nitrile with sulfurous acid or with a water-soluble salt thereof.

Thus, for example, crude adiponitrile is washed with an aqueous solution of ammonium bisulfite. The oil is then washed with water to remove dissolved bisulfite ions. Adiponitrile so purified may be hydrogenated directly to hexamethylene diamine, as described in Example IV. On the other hand, it may be dried either by heating to drive off the water or by other suitable means before use. If desired, the nitrile may be further purified by vacuum distillation. As obtained by the latter method, adiponitrile is a colorless, odorless, slightly viscous oil having $$N_D^{25} 1.4368$$

$$D_4^{20} 0.9596$$

and B. P. 154° C./10 mm.

Example I

Crude adiponitrile was prepared according to the copending U. S. application of Wilbur A. Lazier, Serial No. 133,275, by passing the vapors of adipic acid, together with ammonia, over silica gel at 350° C. The product was condensed, and the aqueous layer drained off. The oily layer had the following analysis:

| | Per cent |
|---|---|
| H₂O | 9.0 |
| Cyclopentanone | 2.5 |
| Adiponitrile | 80.4 |
| Ammonia | 2.6 |
| Residue | 4.5 |
| Total | 99.0 |

A. The crude nitrile was divided into two portions. One portion was distilled through an efficient fractionating column at 17 mm. of mercury pressure with the following results:

| Fraction number | $N_D^{25}$ | Percent total distillate |
|---|---|---|
| 1 | 1.4568 | 4.5 |
| 2 | 1.4406 | 7.5 |
| 3 | 1.4395 | 11.0 |
| 4 | 1.4403 | 13.0 |
| 5 | 1.4403 | 15.0 |
| 6 | 1.4396 | 16.5 |
| 7 | 1.4393 | 23.0 |
| 8 | 1.4385 | 34.0 |
| 9 | 1.4381 | 42.5 |
| 10 | 1.4379 | 51.0 |
| 11 | 1.4378 | 100.0 |

These results are recorded graphically in curve I.

The purified adiponitrile, upon standing 24 hours in a partially filled bottle in the presence of light and air, turned dark in color and gave off the odor of hydrogen cyanide; also this product gave a precipitate on adding five drops of 17% hydrochloric acid to 5 cc. of said nitrile followed by the addition of Nessler's reagent. This test indicated the presence of compounds which decompose to give ammonium ions in the presence of a dilute mineral acid at room temperature.

B. The second portion of the crude nitrile was treated according to the process of the present invention:

Four hundred parts by weight of the crude adiponitrile having the composition indicated was mixed with 30 parts of water and the solution treated with sulfur dioxide until the odor of the latter was plainly noticeable. The gas flow was then interrupted and the liquid was vigorously stirred at room temperature for six hours. The dark colored lower layer was separated and the remaining oil was washed with two 30-part portions of saturated ammonium bisulfite. The oil was then separated and washed twice with 30 parts of water, then twice with 30 parts of 28% aqueous ammonia and finally twice with 30 parts of water. The product was distilled with the following results, using the same distillation apparatus and conditions as were used in Part A above. The results are recorded graphically in curve 2 and numerically below:

| Fraction number | $N_D^{25}$ | Percent total distillate |
|---|---|---|
| 1 | 1.4760 | 1.32 |
| 2 | 1.4600 | 2.64 |
| 3 | 1.4382 | 5.27 |
| 4 | 1.4370 | 6.58 |
| 5 | 1.4370 | 7.90 |
| 6 | 1.4369 | 83.50 |
| 7 | 1.4370 | 96.70 |
| 8 | 1.4376 | 98.67 |
| 9 | 1.4380 | 99.99 |

The pure adiponitrile (fraction 6) was a colorless, mobile oil having a density $$D_4^0 \ 0.9596$$

It did not develop color or hydrogen cyanide on standing 24 hours in a partially filled bottle in the presence of light and air. It had a melting point of 2.41° C., a boiling point of 154° C. at 10 mm. pressure, contained less than 1.0% moisture and did not give a precipitate on adding 5 drops of 17% hydrochloric acid to 5 cc. of nitrile followed by the addition of Nessler's reagent.

Hydrogenation of the nitrile in the presence of 75 parts of ammonia per 100 parts of nitrile, using 10 parts of an active nickel-on-alumina catalyst yielded 6.1% hexamethylene imine, 90.7% hexamethylene diamine, and 3.2% of residue. This example clearly demonstrates the advantage to be gained by purifying adiponitrile with a bisulfite solution prior to distillation. Curves I and II graphically contrast the results of the two methods of purification.

*Example II*

Two hundred and fifty parts of crude adiponitrile prepared as in Example I and having essentially the same analysis was treated with 24.3 parts of sulfur dioxide. The mixture was stirred during 6 hours; then the aqueous layer was separated and the residual oil was washed four times with water using 17.5 parts of water for each washing. After careful fractional distillation the nitrile had a refractive index of $$N_D^{25} \ 1.4368$$

The water-white nitrile did not develop color or hydrogen cyanide on standing 24 hours in the presence of sunlight and moisture in a partially filled bottle. Hydrogenation with a Raney nickel catalyst in the presence of ammonia yielded 90.7% of hexamethylene diamine. This example illustrates a modification in the washing of bisulfite treated crude nitrile which was found satisfactory for semiplant use.

*Example III*

Crude adiponitrile was prepared by passing ammonia, together with the vapors of adipic acid, over a silica gel catalyst at 350° C. After separating the oily layer from the chilled product the material was found to have the following analysis:

| | Per cent |
|---|---|
| Water | 13.4 |
| Cyclopentanone | 1.43 |
| Ammonia | 2.98 |
| Adiponitrile | 71.1 |
| Residue | 9.26 |

Three hundred and two parts of adiponitrile having the above analysis was evacuated until all of the ammonia had been driven off, then 5 parts of concentrated hydrochloric acid was added and the mixture thoroughly agitated. As soon as the initial reaction had subsided, 100 parts of a saturated solution of sodium bisulfite was added and the mixture thoroughly stirred during 12 hours. A semi-solid mass of crystals was thus obtained. After filtering off the crystals and washing them with benzene the combined filtrates were washed twice with 30 parts of saturated sodium bisulfite, then with 30 parts of H₂O and finally with 30 parts of concentrated aqueous ammonia. The oily layer was then subjected to vacuum distillation. After removal of the benzene the nitrile was fractionally distilled at 10 mm. pressure with the following results:

| Fraction number | $N_D^{25}$ | Percent total distillate |
|---|---|---|
| 1 | 1.4590 | 1.37 |
| 2 | 1.4383 | 5.5 |
| 3 | 1.4371 | 9.58 |
| 4 | 1.4368 | 13.7 |
| 5 | 1.4368 | 25.0 |
| 6 | 1.4368 | 83.0 |
| 7 | 1.4368 | 94.5 |
| 8 | 1.4378 | 100.0 |

Residue 0.6%.

The material obtained as fraction 6 was a colorless oil which did not darken or develop hydrogen cyanide after standing in a partially filled bottle for 24 hours exposed to light and air. This oil did not give a precipitate when treated with a few drops of concentrated hydrochloric acid followed by an excess of Nessler's reagent. Hydrogenation with 10% of a catalyst composed of active nickel supported on alumina in the presence of ammonia gave 90.7% of hexamethylene diamine, 5.9% of hexamethylene imine, and 3.4% of residue. This example illustrates the use of sodium bisulfite and the acidification of the crude nitrile with hydrochloric acid prior to the bisulfite treatment. The consumption of acid was minimized by removing dissolved ammonia before acidifying. Benzene was used as a solvent for the nitrile.

*Example IV*

Adiponitrile was prepared by passing the vapors of adipic acid together with ammonia over a silica gel catalyst at 350° C. The product was partially condensed by a proper control of the temperature at which the condensation took place. In this manner a product having the following analysis was obtained:

| | Percent |
|---|---|
| Water | 8.8 |
| Cyclopentanone | 0.13 |
| Adiponitrile | 73.1 |
| Ammonia | 0.03 |
| Residue | 13.5 |

Two hundred and twenty-four parts of adiponitrile having the above analysis was treated with 6.1 parts of sulfur dioxide and 11.0 parts of 73% ammonium bisulfite solution. The mixture was thoroughly agitated during 6 hours, then the bisulfite solution was removed and the residual oil was washed three times with 10 parts of distilled water and once with 10 parts of 28% aqueous ammonia. Without further purification, 100 parts of the above oil was hydrogenated with 75 parts of liquid ammonia and 10 parts of a Raney nickel catalyst. Hydrogenation proceeded at a normal rate (1¼ hours at 120° C. and 2000 pounds pressure) and the product contained 75.3 parts of hexamethylene diamine, 6.3 parts of hexamethylene imine and 8.0 parts of residue. This example illustrates the possibility of hydrogenating bisulfite treated adiponitrile directly without removing dissolved water and without distillation. It will be noted that the yield of diamine is fully as high as when the nitrile is distilled (allowance being made for the water present). The quality of the diamine was fully as good as that obtained from distilled adiponitrile.

*Example V*

Crude adiponitrile was prepared by passing the vapors of adipic acid over silica gel at 350° C. in the presence of ammonia. After separating the oily layer it was found to contain 79.1% of adiponitrile.

One hundred and ninety-seven parts of this oil was treated with 2.8 parts of sulfur dioxide and was then washed four times with 20 parts of saturated sodium chloride solution and finally once with 20 parts of aqueous ammonia. The oil thus obtained was subjected to fractional distillation at 10 mm. pressure using a 13 transfer unit column. In this way 159 parts of pure adiponitrile was obtained. This is 96% of the theoretical amount present in the original oil. The refractive index of this oil at 25° C. was 1.4370. The material was water-white and had a density at 25° of 0.9596. It did not develop color or hydrogen cyanide on standing 24 hours in a partially filled bottle exposed to light and air. Hydrogenation with a modified Raney nickel catalyst yielded 90% of hexamethylene diamine based on the theoretical amount. This example illustrates the use of brine solution in washing the nitrile to diminish losses due to the solubility of adiponitrile in water.

In place of adiponitrile other nitriles may be used. Thus, glutaronitrile, sebaconitrile, pimelonitrile, azelaonitrile, beta-dodecyladiponitrile, beta-cyclohexyl-adiponitrile, alpha-methyladiponitrile, alpha, alpha'-dimethyladiponitrile, octa-decyladiponitrile, and other similarly substituted aliphatic dinitriles may be used in this process. It has been found preferable to use acidulated ammonium bisulfite although sodium bisulfite, potassium bisulfite, or neutral or alkaline sulfites may be used in this connection. Sulfur dioxide itself has a good purifying action on these nitriles when used in aqueous solution.

It has been found convenient to wash the adiponitrile with water. However, other solvents or solutions of salts such as aqueous sodium chloride, ammonium sulfate, sodium sulfate, etc., may be used as wash liquors. Thus the use of saturated brine solutions as in Example V greatly diminishes the solubility of adiponitrile in water and thus enhances the yield of pure product obtained. The nitrile may be used as the crude oil or may be a distilled product or may be dissolved in a suitable inert solvent such as benzene.

The temperature at which the bisulfite treatment takes place may be varied within fairly wide limits. However, for convenience in operation it has been found desirable to work at or near room temperature. Thus, temperatures of from 0° to 100° C. are operable, although it is preferred to work in the range of from 20° to 50° C. since the losses of ammonia and sulfur dioxide are not serious at these temperatures.

The method known to the art for purifying nitriles is to vacuum distill the crude materials, but the products thus prepared darken and liberate hydrogen cyanide within a short time when stored in a partially filled bottle in the presence of light and air. Within twenty-four hours the nitrile so prepared is also black; the exact nature of this darkening was not understood and was usually considered a characteristic property of the nitriles. We have now found that pure nitriles are perfectly stable under these conditions. The present invention provides the only simple, practical, inexpensive, and effective means known to use by which these pure nitriles may be obtained. Nitriles purified in accordance with this invention have been stored as long as six months without darkening appreciably.

It is apparent that many widely different embodiments of this invention may be made without departing from the spirit and scope thereof and therefore it is not intended to be limited except as indicated in the appended claims.

We claim:

1. A process for the purification of an aliphatic dinitrile which comprises washing said aliphatic dinitrile with a solution containing a bisulfite.

2. A process for the purification of adiponitrile which comprises bringing said adiponitrile into contact with a solution containing a member selected from the group consisting of sulfurous acid and its water soluble salts.

3. A process for the purification of an aliphatic dinitrile which comprises washing said aliphatic dinitrile with an acidulated bisulfite solution and then washing the resulting product until essentially free from the bisulfite.

4. A process for the purification of an aliphatic dinitrile which comprises washing said aliphatic dinitrile with an acidulated bisulfite solution, washing the resulting compound with water to remove the bisulfite, and then distilling the product to recover the aliphatic dinitrile.

5. The process for the purification of an aliphatic dinitrile, prepared by the catalytic dehydration of the corresponding ammonia-acid derivative at elevated temperatures, which comprises treating said dinitrile with a compound selected from the group consisting of sulfurous acid and its water-soluble salts.

6. The process in accordance with claim 5 characterized in that the dinitrile is adiponitrile.

7. The process for the purification of adiponitrile, prepared by catalytically dehydrating an ammonia-adipic acid derivative at elevated temperatures, which comprises treating said adiponitrile with a bisulfite in an amount equivalent to about 3% to about 10% by weight of the nitrile.

8. The process in accordance with claim 7 characterized in that the bisulfite is ammonium bisulfite and that it is in active solution in admixture with adiponitrile.

9. A process for the purification of crude adiponitrile of composition similar to that obtained when adipic acid and ammonia are dehydrated over silica gel at about 350° C., which comprises treating said crude adiponitrile with a saturated aqueous solution of sulfur dioxide, separating the resulting adiponitrile and washing same with ammonium bisulfite, then removing the bisulfite and distilling the resulting product so as to recover substantially pure adiponitrile.

10. A process for the purification of crude adiponitrile of composition similar to that obtained when adipic acid and ammonia are dehydrated over silica gel at about 350° C., which comprises treating said crude adiponitrile with a saturated aqueous solution of sulfur dioxide, separating the resulting adiponitrile and washing same to remove sulfur dioxide and compounds containing same.

WILBUR A. LAZIER.
GEORGE W. RIGBY.

Certificate of Correction

Patent No. 2,242,309.      May 20, 1941.

WILBUR A. LAZIER ET AL.

It is hereby certified that errors appear in the printed specification of the above numbered patent requiring correction as follows: Page 2, first column, line 42, for "$D_4^2$" read $D_4^{25}$; line 47, for "1.0%" read *0.1%*; page 3, second column, line 38, for the word "use" read *us*; and that the said Letters Patent should be read with these corrections therein that the same may conform to the record of the case in the Patent Office.

Signed and sealed this 1st day of July, A. D. 1941.

[SEAL]

HENRY VAN ARSDALE,
*Acting Commissioner of Patents.*